(12) United States Patent
Long et al.

(10) Patent No.: US 6,176,453 B1
(45) Date of Patent: *Jan. 23, 2001

(54) RADIATOR USING THERMAL CONTROL COATING

(75) Inventors: Lynn E. Long, Manhattan Beach; James R. Denman, El Segundo, both of CA (US)

(73) Assignee: Hughes Electronics Corporation, El Segundo, CA (US)

( * ) Notice: Under 35 U.S.C. 154(b), the term of this patent shall be extended for 0 days.

This patent is subject to a terminal disclaimer.

(21) Appl. No.: 09/209,556

(22) Filed: Dec. 11, 1998

Related U.S. Application Data

(63) Continuation-in-part of application No. 08/819,747, filed on Mar. 18, 1997, now Pat. No. 5,884,868.

(51) Int. Cl.⁷ .............................. B64G 1/00; B64G 1/22
(52) U.S. Cl. .................................. 244/158 A; 244/158 R
(58) Field of Search ............................. 244/158 A, 158 R, 244/163, 133; 428/336, 335, 334, 332; 165/48.2, 133, 134.1

(56) References Cited

U.S. PATENT DOCUMENTS

| | | | |
|---|---|---|---|
| 3,653,942 | * 4/1972 | Boebel et al. | 244/158 R |
| 4,181,771 | * 1/1980 | Hanson et al. | 428/327 |
| 4,321,300 | * 3/1982 | Farrauto et al. | 428/332 |
| 4,330,344 | * 5/1982 | Terai et al. | 428/336 |
| 4,332,628 | * 6/1982 | Andoh | 428/336 |
| 4,580,748 | * 4/1986 | Dalby | 244/158 R |
| 4,663,234 | * 5/1987 | Bouton | 428/422 |
| 4,669,685 | * 6/1987 | Dalby | 244/158 R |
| 4,797,325 | * 1/1989 | Verdin et al. | 428/473.5 |
| 5,217,600 | * 6/1993 | Le et al. | 205/328 |
| 5,296,285 | * 3/1994 | Babel et al. | 428/213 |
| 5,310,141 | * 5/1994 | Homer et al. | 244/158 R |
| 5,400,986 | * 3/1995 | Amore et al. | 244/173 |
| 5,401,573 | * 3/1995 | Babel et al. | 428/336 |
| 5,626,314 | * 5/1997 | Reynolds et al. | 244/158 A |
| 5,634,612 | * 6/1997 | Faisant | 244/158 A |
| 5,665,274 | * 9/1997 | Long et al. | 252/511 |
| 5,876,856 | * 3/1999 | Long | 428/446 |

FOREIGN PATENT DOCUMENTS

| | | |
|---|---|---|
| 003306880A1 | * 8/1984 | (DE) . |
| 403065498 | * 3/1991 | (JP) . |

\* cited by examiner

*Primary Examiner*—Michael J. Carone
*Assistant Examiner*—Fredrick T. French, III
(74) *Attorney, Agent, or Firm*—Terje Gudmestad; M. W. Sales

(57) ABSTRACT

A spacecraft has internal structure which generates heat, and a radiator element in thermal communication with the spacecraft internal structure. The radiator element has a radiating surface and a coating on the radiating surface including a white thermal control paint. The paint has an initial solar absorptance of not greater than 0.16 and an initial infrared emittance of not less than about 0.80. The standard end-of-life projected solar absorptance is not more than about 0.33 for a paint with an inorganic binder, and the standard end-of-life projected solar absorptance is not more than about 0.6 for a paint with an organic binder.

22 Claims, 3 Drawing Sheets

FIG.1
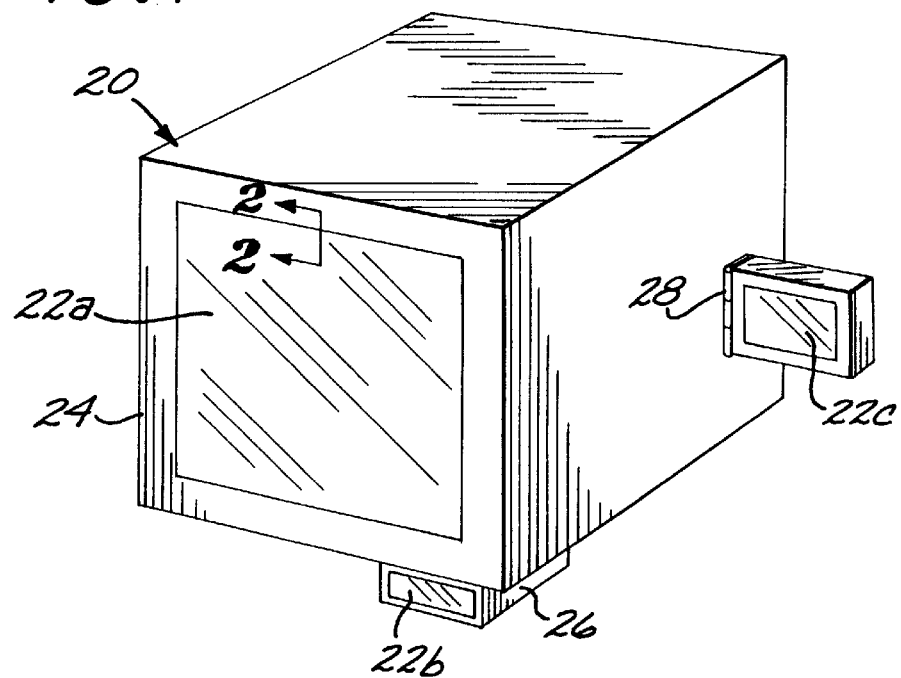
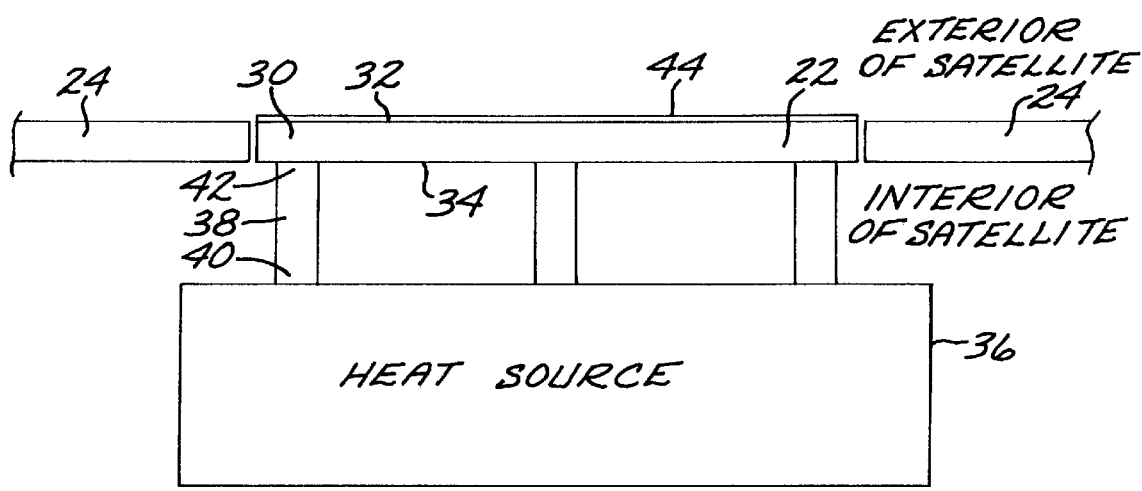
FIG.2A

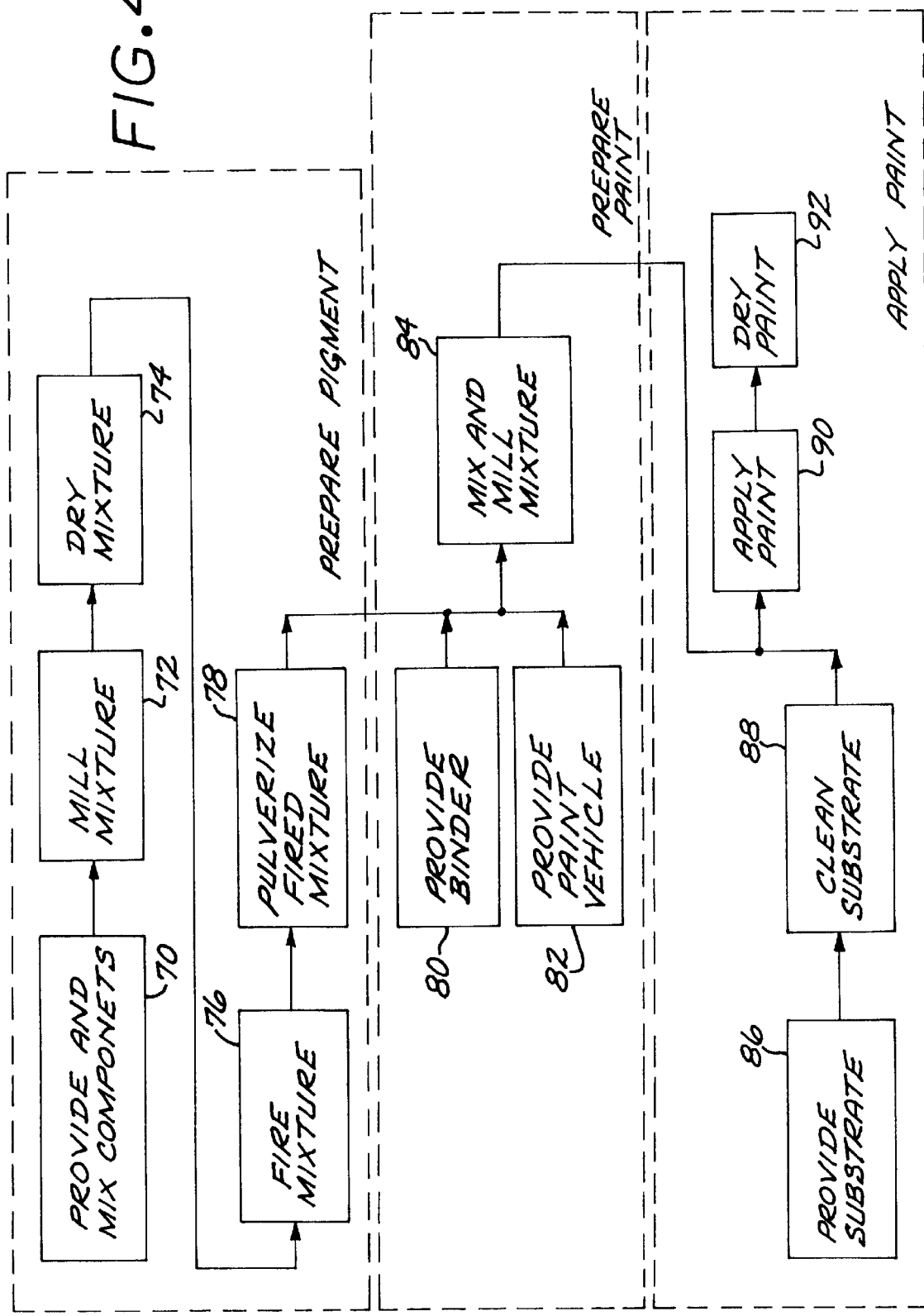

RADIATOR USING THERMAL CONTROL COATING

BACKGROUND OF THE INVENTION

This application is a continuation in part of allowed application Ser. No. 08/819,747, filed Mar. 18, 1997, which became U.S. Pat. No. 5,884,868 issued on Mar. 23, 1999.

This invention relates to radiators, and, more particularly, to radiators used in spacecraft.

A radiator is designed to radiate heat to its surroundings. Spacecraft whose occupants, electronics, or power sources generate large amounts of heat employ one or more radiators to transfer the generated heat from the interior of the spacecraft to free space and to reflect incident heat from solar radiation exposure. The radiators also aid in dissipating static electricity on the surface of the spacecraft. The radiators are necessary to prevent heating of the interior of the spacecraft to unacceptably high levels. For some spacecraft such as large communications satellites that generate and utilize large amounts of power, removal of excess heat is a significant factor in the design of the spacecraft, and large amounts of radiator surface are required.

In a commonly used construction of a spacecraft radiator, the radiating surface is formed of a large number of individual mirror-like radiators. A single larger mirror-like radiator is not used because of the likelihood that it would crack due to thermal strains. Each mirror-like radiator is 1–2 inches on a side. Each mirror-like radiator is formed of a ceramic-glass substrate about 0.002–0.010 inches thick that is coated on the inwardly facing surface with a metallic silver coating. The metal-coated mirror has a relatively low solar absorptance and a relatively high infrared emittance, so that heat is effectively radiated away without absorbing excessive energy from incident sunlight. The opposite, outwardly facing surface of the ceramic-glass substrate is coated with a layer of transparent indium-tin-oxide that serves to dissipate static charges. The metallic silver-coated inwardly facing surface is bonded to the underlying structure with a silicone adhesive.

This radiator construction is operable and widely used on communications satellites. However, the fabrication of the spacecraft using the individual mirror-like radiators is a time-consuming, expensive process. Hundreds or thousands of individual mirror-like elements are fabricated by deposition processes and then individually attached to the underlying support surface. Because the glass ceramic mirror substrates are thin and large in lateral extent relative to their thickness, they are fragile and easily broken during fabrication, assembly, or service.

There is accordingly a need for an improved approach to the construction of radiators used in spacecraft and for other applications. The present invention fulfills this need, and further provides related advantages.

SUMMARY OF THE INVENTION

The present invention provides a radiator and a spacecraft which utilizes such a radiator. The radiator has excellent performance in the space environment. It is fabricated and installed in the spacecraft much less expensively and more quickly than a radiator using conventional mirror-like radiating elements. The weight of the radiator is reduced as compared with the mirror-like radiator, an important consideration for launching the spacecraft from earth. The radiator of the invention is more robust than a mirror-like radiator.

In accordance with the invention, a radiator comprises a structure which generates heat, and a radiator element in thermal communication with the structure. The radiator element comprises a radiating surface, with a coating on the radiating surface comprising a white thermal control paint. The paint has an initial solar absorptance of not greater than 0.16, preferably not greater than about 0.14 and more preferably not greater than about 0.10, and an initial infrared emittance of not less than about 0.80. (The "initial" properties are those measured after the paint is applied and dried, but before any substantial exposure to a space environment.) The structure which generates heat is preferably the internal structure of a spacecraft such as a satellite.

The paint used in the coating on the radiating surface of the radiator is formed of white pigment particles in a binder. The preferred pigment particles have a composition of $Zn[xAl(1-x)Ga]_2O_4(\delta In)$, termed a zinc aluminate gallate, where the value of x is from 0 to 1 and the value of $\delta$ is from 0 to about 0.2. The pigment particles may also be a zinc-containing pigment such as the doped or undoped ZnO pigment disclosed in U.S. Pat. No. 5,094,693, whose disclosure is incorporated by reference. The binder is preferably an inorganic binder such as a silicate, and preferably potassium silicate, but an organic binder may also be used for less-demanding applications. The weight ratio of pigment to binder is preferably from about 3:1 to about 5:1, but may be less than about 3:1. The paint thickness is preferably from about 0.003 to about 0.006 inches, after drying. The zinc aluminate gallate paint with a potassium silicate binder has an initial solar absorptance $\alpha$ of less than 0.10, and aluminum-doped zinc oxide paint with a potassium silicate binder has an initial solar absorptance of about 0.13–0.18.

The paint is applied to the radiating surface of the radiator using conventional painting techniques such as brushing or spraying, or by non-vehicle painting techniques such as plasma spray.

Many white coatings have been used for the exterior portions of spacecraft other than the radiators. During extended exposure to the space environment of ultraviolet radiation, gamma radiation, electrons, and protons, the initially white coatings become yellow and then gray as their solar absorptance rises. As the solar absorptance rises, the coatings become less efficient thermal coatings, because they absorb increasing amounts of solar energy. This loss of efficiency typically takes at least several years and is not a concern for short-lived spacecraft or satellites.

The gradually increasing solar absorptance with increasing exposure is of relatively little significance for the non-radiator portions of the exterior of the spacecraft, even those spacecraft such as communications satellites that spend many years in space. These non-radiator regions are not designed to dissipate larger amounts of heat than they absorb, and in many cases do not face the sun. If the solar absorptance for these portions of the spacecraft rises, there is relatively little effect on the total heat balance of the spacecraft. The radiators, on the other hand, must dissipate large amounts of interiorly generated heat. Due to the required orientation of the antennas and solar cells of the spacecraft, the radiators often must face toward the sun. If the solar absorptance of the radiators increases significantly over the operating life of the spacecraft, the radiators begin to absorb large amounts of heat and consequently radiate the interiorly generated heat less efficiently. The thermal balance of the spacecraft is degraded. The temperature of the interior of the spacecraft begins to rise, and eventually exceeds the acceptable operating temperatures.

Thus, the radiators of the spacecraft have different operating conditions and requirements than the exterior non-radiator walls of the spacecraft. The coatings that have long been used on the non-radiator exterior walls of the spacecraft could not be used for the radiators because of their inadequate long-term stability in the space environment. The development of the white coatings with low initial values of solar absorptance and high initial values of solar emittance has made possible the present approach to an improved radiator, because the initial values of solar absorptance are sufficiently far removed from the maximum permissible value after extended exposure that the gradual increase in solar absorptance does not result in the inoperability of the radiator.

At the present time, there is no known approach for preventing the gradual increase in the solar absorptance that occurs over time. Instead, the initial solar absorptance must be selected to be sufficiently low such that, after the gradual increase in solar absorptance over time and exposure, the paint still has an acceptable solar absorptance. In the present invention, the standard end-of-life solar absorptance is not greater than about 0.33 when an inorganic binder is used, most preferably not greater than about 0.30. In order to achieve these standard end-of-life solar absorptances, the initial solar absorptance is not greater than 0.16, preferably not greater than about 0.14, and most preferably not greater than about 0.10.

The radiator of the invention provides an important advance in spacecraft systems and particularly in heat dissipation and reflection by the spacecraft radiator. The radiator is effective in dissipating heat to the surroundings and in reflecting incident solar radiation, both initially and after extended exposure to the space environment. It is much more readily fabricated and installed than a conventional radiator having a mirror-like structure. The fabrication and installation are also accomplished much faster than in the prior approach. The latter is an important consideration in the highly competitive business of communications satellites, where delivery times on the order of 12 months are becoming common, as compared with normal delivery times on the order of 24 months or longer in the past. Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

BRIEF DESCRIPTION OF THE DRAWINGS

FIG. 1 is a schematic perspective view of a communications satellite;

FIG. 2A is an enlarged schematic sectional view of a first embodiment of a portion of the satellite of FIG. 1, taken along line 2—2;

FIG. 4 is a block flow diagram of a method for practicing the invention.

DETAILED DESCRIPTION OF THE INVENTION

Figure 2B:
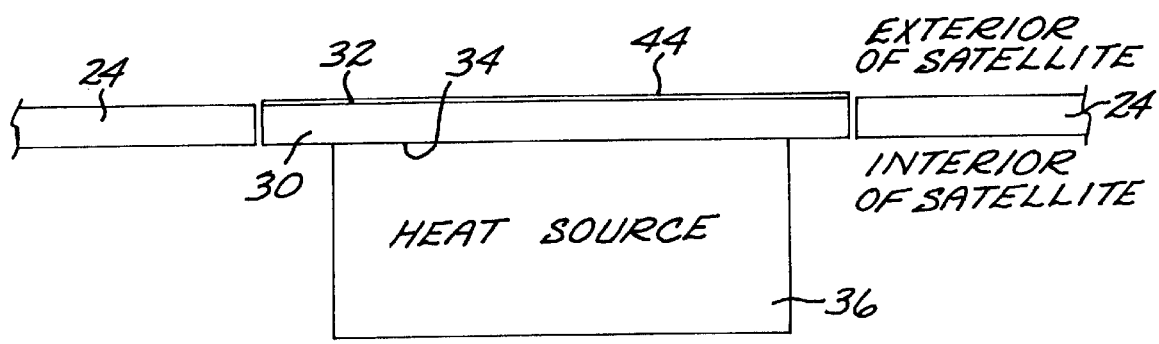
FIG. 2B is an enlarged schematic sectional view of a second embodiment of a portion of the satellite of FIG. 1, taken along line 2—2.

FIG. 1 is a schematic view of a spacecraft, here a communications satellite 20, having radiators 22 of three types affixed to the body of the satellite. A first radiator 22a overlies a portion of an external wall 24 of the satellite and is disposed in fixed relation to the remainder of the satellite. A second radiator 22b is supported in fixed relation to a projection 26 that contains the batteries of the satellite. A third radiator 22c is mounted in a deployable fashion from the satellite, on a hinge mechanism 28. Any or all of these radiators 22a, 22b, and 22c may be made using the approach of the invention. In general, the radiators 22 are distinct from other exteriorly facing portions of the spacecraft such as the skin structure, the solar cells, and the antennas, in that the radiators 22 are made of materials with high thermal radiation properties and are in thermal communication with internal heat sources of the spacecraft by direct contact or by high-thermal-conductivity thermal transfer media, and are intentionally designed to radiate large amounts of heat. The structure of the spacecraft radiator will be discussed in more detail in reference to FIG. 2A.

FIGS. 2A and 2B are schematic sectional views of two designs of the radiator 22. The radiator 22 is positioned adjacent to the external wall 24 (sometimes termed the "skin") of the satellite 22, and in some instances may be flush with the external wall 24. The radiator 22 includes a radiator body 30 having an outwardly facing radiating surface 32 and an inwardly facing surface 34. The radiator body 30 is made of a material that is a good thermal conductor, such as aluminum or aluminum alloy, or a relatively high-thermal-conductivity composite material such as graphite/epoxy composite material. In one approach, the radiator body is a honeycomb structure with an outwardly facing face sheet bonded to the honeycomb. The external wall 24, on the other hand, is typically not a good thermal conductor and is insulated from internal heat sources.

The inwardly facing surface 34 is in thermal communication with a heat source 36 that is part of the internal structure of the spacecraft. The heat source 36 may be any heat source such as, for example, a battery, an electronics unit, or a crew compartment. The inwardly facing surface 34 may be in thermal communication with the heat source 36 through a thermal transfer medium 38, as shown in FIG. 2A. The thermal transfer medium has a first end 40 in thermal communication with the heat source and a second end 42 in thermal communication with the inwardly facing surface 34 of the radiator body 30. The thermal transfer medium 38 may be any thermal conductor, such as a metallic or nonmetallic strip, a heat pipe, or other medium. Equivalently for the present purposes and as illustrated in FIG. 2B, the heat source 36 may be in direct thermal contact with the inwardly facing surface 34 of the radiator body 30.

Figure 3:
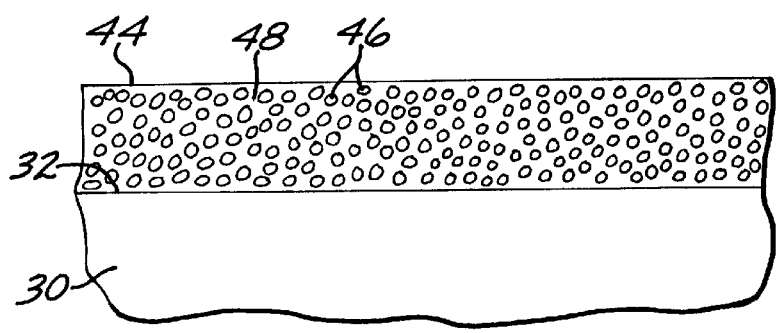
FIG. 3 is an enlarged view of the coating applied to the radiating surface of the radiator.

The outwardly facing radiating surface 32 of the radiator body 30 has a coating 44 applied thereto. The coating 44 includes a white thermal control paint having a structure generally illustrated in FIG. 3. The coating 44 may cover all or only a portion of the surface 32, although in practice it would normally cover the entire surface 32 as shown in FIGS. 2A and 2B.

The coating 44 is a paint comprising a plurality of pigment particles 46 mixed with a binder 48. The pigment particles are white in color. The particles are preferably of a composition $Zn[xAl(1-x)Ga]_2O_4(\delta In)$, where the value of x is from 0 to 1 and the value of $\delta$ is from 0 to about 0.2, which has a spinel crystal structure. The particles may instead be the doped or undoped zinc oxide particles disclosed in U.S. Pat. No. 5,094,693, which has a wurtzite crystal structure, or other operable particles.

The binder is an inorganic or organic material. The preferred inorganic binder is a silicate, most preferably potassium silicate, but other silicates such as sodium silicate may also be used. The binder may instead be an organic material such as dimethyl silicone, poly(dimethyl-siloxane), polyurethane, polyamide, or polyurea. The inorganic binder is preferred for use in radiator paints having the most demanding exposure conditions, such as geosynchronous communications satellites that remain in orbit for many years. For these applications, spacecraft designs require that the solar absorptance of the radiator paint not exceed about 0.33, preferably about 0.30, after extended exposure to the spacecraft environment. The organic binder may be used in less-demanding applications such as medium earth orbit communications satellites that typically orbit in the 6,000–10,000 mile altitude range. For these less-demanding applications, spacecraft designs require that the solar absorptance of the radiator paint not exceed about 0.6 after extended exposure.

For both the inorganic and the organic binders, the weight ratio of pigment to binder is preferably from about 3:1 to about 5:1, although the coating is operable for values outside this range. The thickness of the coating 44 is preferably from about 0.003 to about 0.006 inches after drying to a solid form, although the coating is operable for values outside this range. In this range, the thicker the coating of a thermal control paint, the lower is the solar absorptance but the greater the weight of the coating. However, increasing thicknesses above about 0.006 inches increase the weight without corresponding reductions in solar absorptance.

FIG. 4 depicts a preferred method for preparing the particles 46, for preparing the paint material used in the coating layer 44, and for painting the radiating surface 32 of the radiator body 30.

If commercially available, the pigment particles may be purchased. If not, they may be prepared by the following procedure. The components of the particles are provided and mixed together, numeral 70. In the preferred formulation procedure, the readily available components ZnO, $Al_2O_3$, $Ga_2O_3$, and $In_2O_3$ are used as starting materials. Thus, to prepare $ZnAl_2O_4$, the appropriate amounts of ZnO and $Al_2O_3$ are mixed together. To prepare $ZnGa_2O_4$, the appropriate amounts of ZnO and $Ga_2O_3$ are mixed together. To prepare $Zn[xAl (1-x)Ga]_2O_4$, the appropriate amounts of ZnO, $Al_2O_3$, and $Ga_2O_3$ are mixed together. If any of these compositions is to be doped with indium, as is normally the case, the appropriate amount of $In_2O_3$ is added to the mixture. A mixing medium, which later is removed, may be added to promote the mixing of the components. Preferably, water is used as the mixing medium.

The components and the mixing medium are milled together to form a mechanical mixture, numeral 72. After milling is complete, the mixing medium is removed by evaporation, numeral 74. The dried mixture is fired to chemically react the components together, numeral 76, at a temperature that is preferably in the range of from about 1000° C. to about 1300° C. A preferred firing treatment is 1160° C. for 6 hours, in air. After cooling, the agglomerated mass resulting from the firing is lightly pulverized, as with a mortar and pestle, numeral 78. The resulting particulate has a size range of from about 0.1 micrometer to about 5 micrometers. The preparation of the particulate pigment is complete.

The paint is prepared by providing the particulate material, prepared as described above or otherwise. The binder is provided, numeral 80, to adhere the particles together in the final product. The binder is selected to provide good adherence of the particles to each other and of the particles to the underlying substrate, with acceptable physical properties. For example, the binder must withstand the environment to which the paint is exposed, such as space.

The preferred inorganic binder for demanding applications is potassium silicate. The binder is present in an operable amount. In a typical case, the binder is present in an amount such that the ratio, by weight, of the pigment to the binder is from about 3:1 to about 5:1. If the ratio is less than about 3:1, the paint is operable but tends to be translucent after drying, so that the initial value of the solar absorptance is too high. In that case, a second coat or a thicker first coat of the paint may be required. If the ratio is more than about 5:1, the critical pigment volume concentration (CPVC) is exceeded, the paint has insufficient mechanical strength, and the paint falls apart when dried.

The pigment particles and the binder are jointly selected so that the final dried paint has an initial solar absorptance of not greater than 0.16, preferably not greater than about 0.14, and most preferably not greater than about 0.10, and an initial infrared emittance of not less than about 0.80. A high infrared emittance of not less than about 0.8 is required in order to radiate heat away from the radiator. If the initial infrared emittance is less than about 0.8, the radiator will not effectively radiate heat away. The infrared emittance does not degrade substantially with extended exposure to the space environment. If the initial solar absorptance of the paint is in excess of 0.16, it will be difficult or impossible to maintain the standard end-of-life projected solar absorptance within the required limits. Preferably, the initial solar absorptance of the paint is less than about 0.14 and most preferably less than about 0.10, so as to ensure that the standard end-of-life projected solar absorptance is less than the upper limits dictated by spacecraft design.

A low solar absorptance is required so that the radiator is not excessively heated by incident thermal energy when the radiator is facing the sun. White paints tend to age and become yellow and then gray with extended periods of exposure to a space environment. As the paint becomes gray, its solar absorptance increases so that the efficiency of the radiator falls. It is therefore preferred that the paint with an inorganic binder have a standard end-of-life projected solar absorptance, as determined by standard accelerated exposure testing, of no greater than about 0.33, preferably about 0.30. It is preferred that the paint with an organic binder have a standard end-of-life projected solar absorptance, as determined by standard accelerated exposure testing, of no greater than 0.60. If these values are substantially exceeded, the radiator does not function sufficiently well toward the end of its life that heat is efficiently removed from the interior of the spacecraft, and the interior components overheat. (The "standard end-of-life projected solar absorptance" is that measured after the paint has been applied and dried, and thereafter subjected to a standard accelerated exposure test of the type discussed next.)

It is not practical to test the paint under long-term space conditions because many years of exposure is required in order to assess the end-of-life properties. Instead, well-known accelerated tests are used to simulate the effect on the coating of long-term space exposure. In the accelerated test used to determine the standard end-of-life projected solar absorptance to determine whether a paint falls within the scope of the present invention, the paint is tested by simultaneous or serial exposure to ultraviolet radiation, electrons, and optionally protons according to the following test protocols or their effective equivalents. The test protocols are as follows for both the present paint having the inorganic binder and the paint having the organic binder. Ultraviolet exposure testing is accomplished by exposure for 1000 hours to ultraviolet light having 1–3 times, preferably 1–2 times, and most preferably 1 time the ultraviolet intensity of the sun. Electron exposure testing is accomplished with a first exposure of $1\times10^{18}$ electrons per square centimeter at an energy of 35 keV (thousands of electron volts) and a flux of $6\times10^9$ electrons per square centimeter-second, and a second exposure of $1\times10^{18}$ electrons per square centimeter at an energy of 100 keV and a flux of $6\times10^9$ electrons per square centimeter-second Proton exposure testing is accomplished with a first exposure of $3\times10^{16}$ protons per square centimeter at an energy of 45 keV and a flux of $5\times10^{13}$ protons per square centimeter-second, a second exposure of $1\times10^{16}$ protons per square centimeter at an energy of 90 keV and a flux of $1\times10^{13}$ protons per square centimeter-second, a third exposure of $5\times10^{15}$ protons per square centimeter at an energy of 160 keV and a flux of $5\times10^{12}$ protons per square centimeter-second, and a fourth exposure of $3\times10^{15}$ protons per square centimeter at an energy of 300 keV and a flux of $3\times10^{12}$ protons per square centimeter-second.

The solar absorptances measured both before and after this standard end-of-life exposure are determined, and the solar absorptance after exposure is taken as the measure of the standard end-of-life projected solar absorptance (corresponding to about 15 years of exposure in geosynchronous orbit). For example, in the case of the $Zn[xAl(1-x)Ga]_2O_4$ particles and preferred potassium silicate binder, the initial solar absorptance of a paint having an inorganic binder is less than 0.10, and typically about 0.06. After exposure, the solar absorptance is higher, but not greater than about 0.33, and preferably not greater than about 0.3. In the case of the $Zn[xAl(1-x)Ga]_2O_4$ particles in an organic binder, the initial solar absorptance is about 0.15. After exposure, the solar absorptance is higher, but less than about 0.6. From this and other testing, the maximum acceptable initial solar absorptance is estimated to be 0.16 in order to achieve the desired standard end-of-life projected solar absorptance. If the initial solar absorptance is greater than 0.16, the standard end-of-life projected solar absorptance will be unacceptably great. An initial solar absorptance no greater than about 0.14 is preferred, to provide a margin of error in achieving the desired standard projected end-of-life solar absorptance. An initial solar absorptance of no greater than about 0.10 is most preferred, as it produces a lower standard end-of-life projected solar absorptance. Initial solar absorptances in the range of about 0.10 to 0.16 are acceptable. The standard end of life absorptance requirements, as discussed above (i.e., 0.33 maximum, preferably no greater than 0.30) should also be met.

The mixture of pigment and binder is ordinarily a solid, and a paint vehicle may be added to form a solution or a slurry that may be applied using conventional painting techniques, numeral 82. One preferred paint vehicle is water, which does not have adverse environmental impacts when later evaporated. Organic paint vehicles such as xylene and naphtha may also be used. The amount of the paint vehicle is selected to provide a consistency that will permit application of the paint by the desired approach. For example, application by spraying requires the use of more of the paint vehicle than application by brush or roller.

The paint may instead be applied by a technique where no vehicle is used, and in that case the step 82 is omitted.

The particles, binder, and paint vehicle (where present) are mixed together and milled together, numeral 84, to form a liquid paint formulation in which the particles do not rapidly separate. There may be some separation over extended periods of time, but the paint is normally stirred or agitated just before or at the time of application. The preparation of the paint is complete.

The paint is applied by providing the radiator body 30 to be coated as the substrate, numeral 86, and cleaning the substrate, numeral 88. There is no known limitation on the type of substrate, but for a radiator the substrate is a good thermal conductor such as a metal. A preferred metal is aluminum or an aluminum alloy. The surface of the substrate is cleaned by any operable technique, such as washing and scouring in a detergent solution, rinsing in tap water, rinsing in de-ionized water, and drying in air. A composite material having sufficiently good thermal conductivity such as a graphite/organic resin (e.g., epoxy) composite radiator substrate may instead be used.

The paint is applied to the surface of the substrate, numeral 90. At the outset of the application, the surface of the substrate may be primed to improve the adhesion of the paint. Priming is preferred for application of the paint containing an inorganic binder to metallic surfaces such as aluminum. Preferably, the priming, if used, is accomplished by rubbing a small amount of the paint into the surface using a clean cloth, to achieve good contact to the surface.

The paint layer is thereafter applied by any operable technique, with spraying being preferred. As indicated earlier, the amount of paint vehicle present in the paint is selected to permit application by the preferred approach. At this point, the paint is a thin film of a liquid material. The paint may also be applied by a plasma spray technique or the like wherein the mixture of pigment and binder is supplied to a heated region such as a plasma and directed toward the substrate. The plasma-heated mixture of pigment and binder strikes the substrate and solidifies thereon.

The paint is dried as necessary to leave a thin film of a solid material, numeral 92. For a paint with an organic binder, the drying is preferably accomplished at ambient temperature with a 35 percent or greater humidity and for a time of 7 days. For a paint with an inorganic binder, any humidity level is acceptable. Drying removes the paint vehicle by evaporation. Additionally, the drying step may accomplish a degree of curing of any curable components, as where a curable organic or inorganic binder is used. The paint layer is preferably from about 0.003 to about 0.006 inches thick after drying. The painting is complete.

If the radiator 22 is manufactured as a separate element, it is thereafter affixed to the wall 24 and placed into thermal contact with the satellite internal structure that generates heat, as shown in FIGS. 2A and 2B.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A spacecraft, comprising:
    a spacecraft satellite internal structure which generates heat; and
    a radiator element in thermal communication with the spacecraft internal structure which generates heat, the radiator element comprising
    a radiating surface, and
    a coating on the radiating surface comprising a white thermal control paint having a thickness of from about 0.003 to about 0.006 inches, the paint comprising a mixture of zinc-containing pigment particles and a binder and having an initial solar absorptance of not greater than 0.16 and an initial infrared emittance of not less than about 0.80.

2. A spacecraft, comprising:

a spacecraft internal structure which generates heat; and a radiator element in thermal communication with the spacecraft internal structure which generates heat, the radiator element comprising a radiating surface, and a coating on the radiating surface comprising a white thermal control paint having an inorganic binder, the paint having a standard end-of-life projected solar absorptance of not more than about 0.33.

3. The spacecraft of claim 2, wherein the binder is potassium silicate.

4. A spacecraft, comprising:

a spacecraft internal structure which generates heat; and a radiator element in thermal communication with the spacecraft internal structure which generates heat, the radiator element comprising a radiating surface, and a coating on the radiating surface comprising a white thermal control paint having an organic binder, the paint having a standard end-of-life projected solar absorptance of not more than about 0.6.

5. The spacecraft of clam 4, wherein the binder is selected from the group consisting of dimethyl silicone, poly(dimethyl-siloxane), polyurethane, polyamide, and polyurea.

6. A spacecraft, comprising:

a spacecraft internal structure which generates heat; and a radiator element in thermal communication with the spacecraft internal structure which generates heat, the radiator element comprising a radiating surface, and a coating on the radiating surface comprising a white thermal control paint, the paint having an initial solar absorptance of not greater than 0.16 and an initial infrared emittance of not less than about 0.80.

7. The spacecraft of claim 6, wherein the spacecraft is a satellite.

8. The spacecraft of claim 6, wherein the radiator element is disposed in fixed relation to the spacecraft internal structure.

9. The spacecraft of claim 6, wherein the radiator element is deployable between a first position in relation to the spacecraft internal structure and a second position in relation to the spacecraft internal structure.

10. The spacecraft of claim 6, wherein the radiating surface comprises a material selected from the group consisting of aluminum, an aluminum alloy, and a composite material.

11. The spacecraft of claim 6, wherein the paint has an initial solar absorptance of from about 0.10 to 0.16.

12. The spacecraft of claim 6, wherein the paint has an initial solar absorptance of not greater than about 0.14.

13. The spacecraft of claim 6, wherein the coating has a thickness of from about 0.003 inches to about 0.006 inches.

14. The spacecraft of claim 6, wherein the paint comprises zinc-containing pigment particles.

15. The spacecraft of claim 6, wherein the spacecraft further includes a thermal transfer medium having a first end in thermal communication with the spacecraft internal structure which generates heat and a second end in thermal communication with the radiator element.

16. The spacecraft of claim 6, wherein the spacecraft thermal structure which generates heat is in direct physical contact with the radiator.

17. The spacecraft of claim 6, wherein the paint comprises an organic binder.

18. The spacecraft of claim 17, wherein the binder is selected from the group consisting of dimethyl silicone, poly(dimethyl-siloxane), polyurethane, polyamide, and polyurea.

19. The spacecraft of claim 17, wherein the paint has a standard end-of-life projected solar absorptance of not more than about 0.6.

20. The spacecraft of claim 6, wherein the paint comprises an inorganic binder.

21. The spacecraft of claim 20, wherein the binder is potassium silicate.

22. The spacecraft of claim 20, wherein the paint has a standard end-of-life projected solar absorptance of not more than about 0.33.

\* \* \* \* \*